F. E. ARNDT.
CONVEYING MECHANISM FOR UNLOADING MACHINES.
APPLICATION FILED MAR. 25, 1922.
1,437,581.
Patented Dec. 5, 1922.
4 SHEETS—SHEET 1.
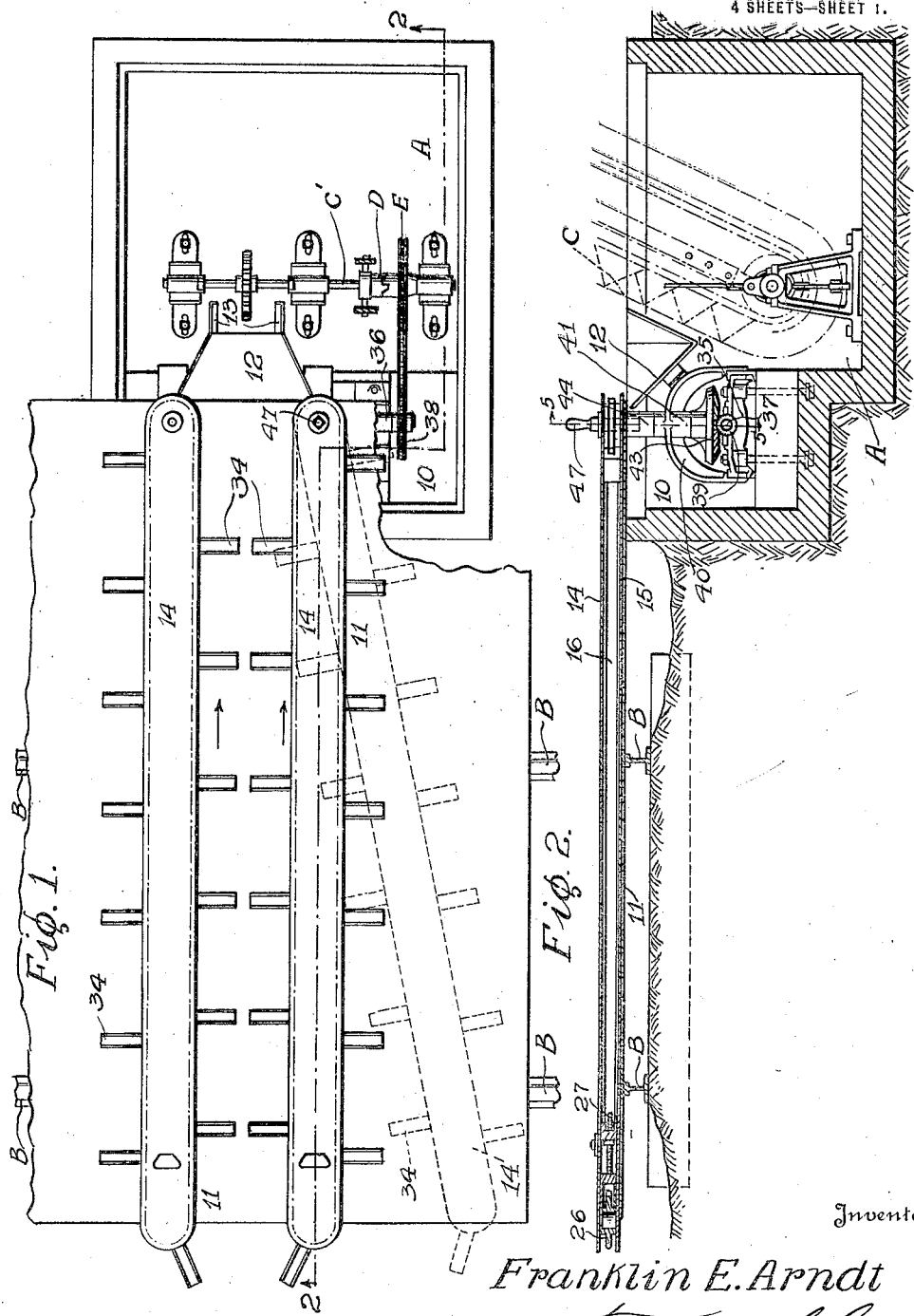
Inventor
Franklin E. Arndt
By Frederick S. Hill
Attorney

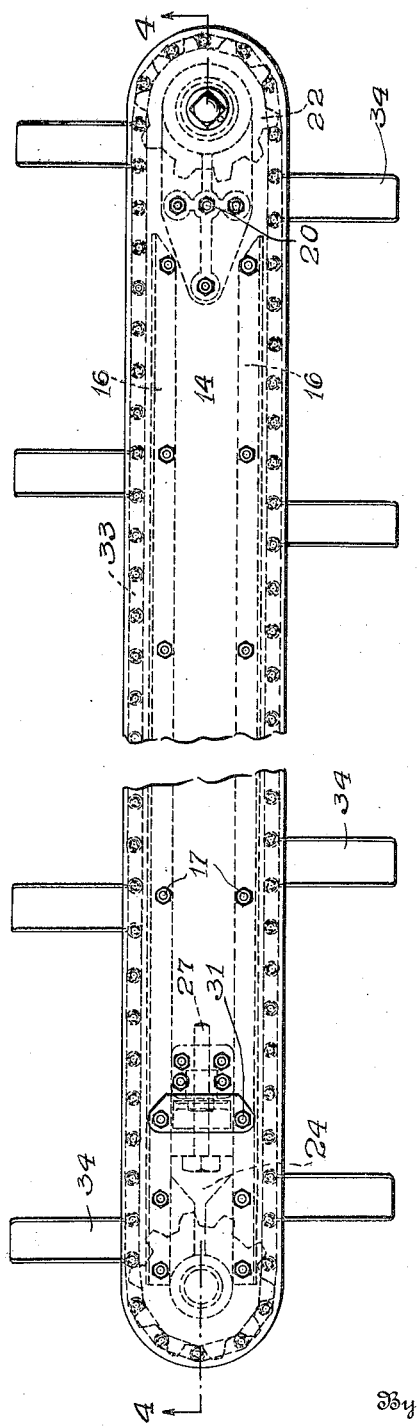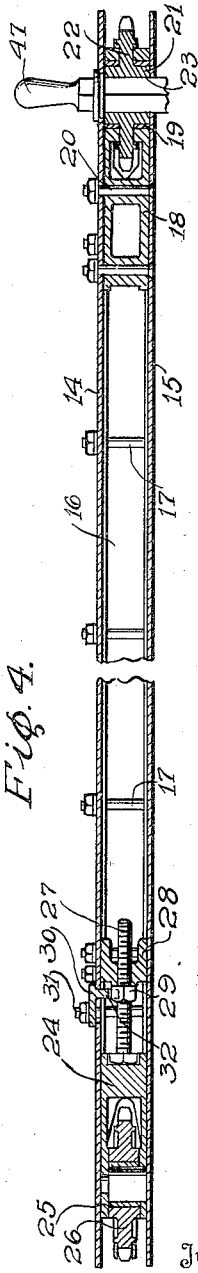

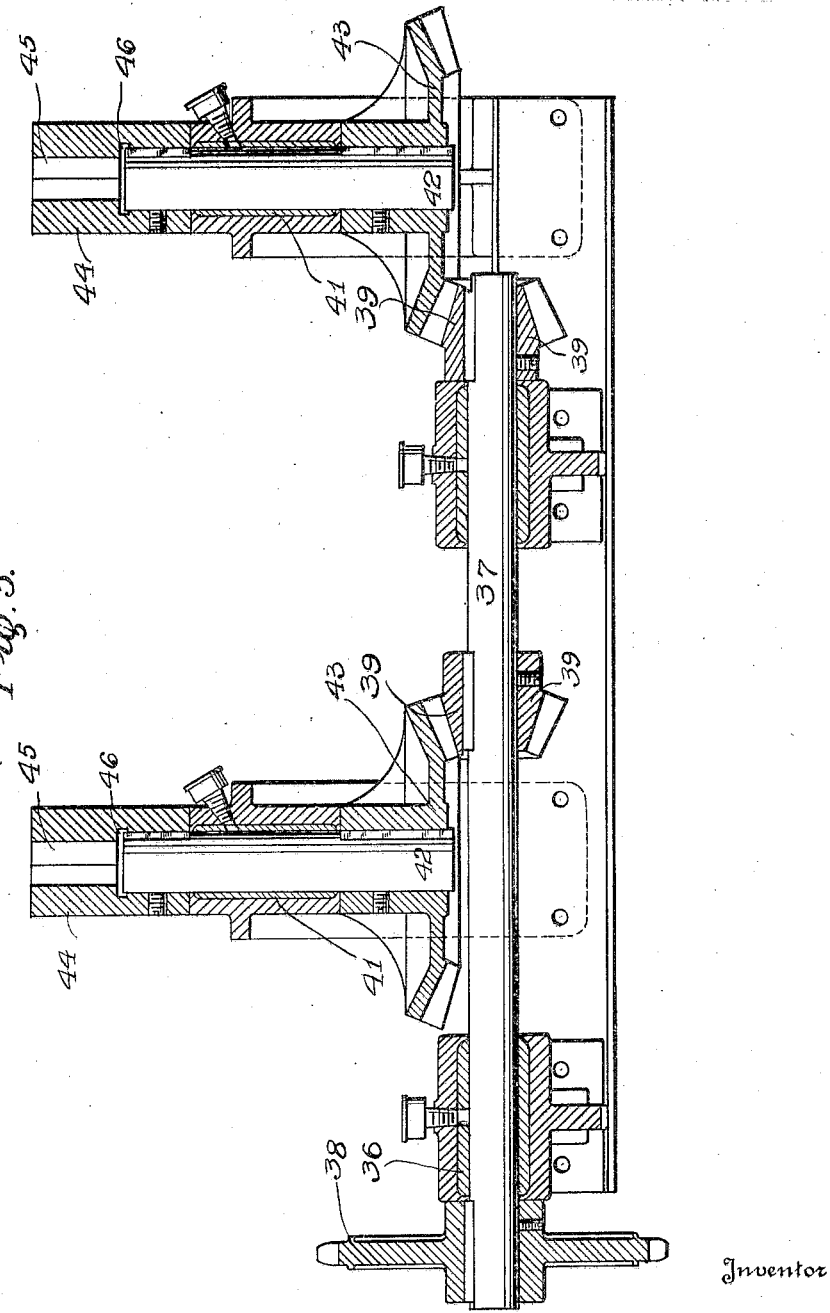

F. E. ARNDT.
CONVEYING MECHANISM FOR UNLOADING MACHINES.
APPLICATION FILED MAR. 25, 1922.
1,437,581.
Patented Dec. 5, 1922.
4 SHEETS—SHEET 4.
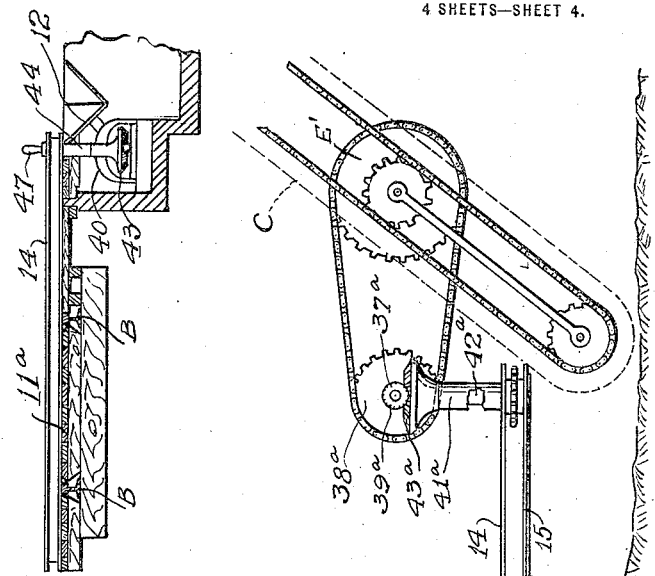
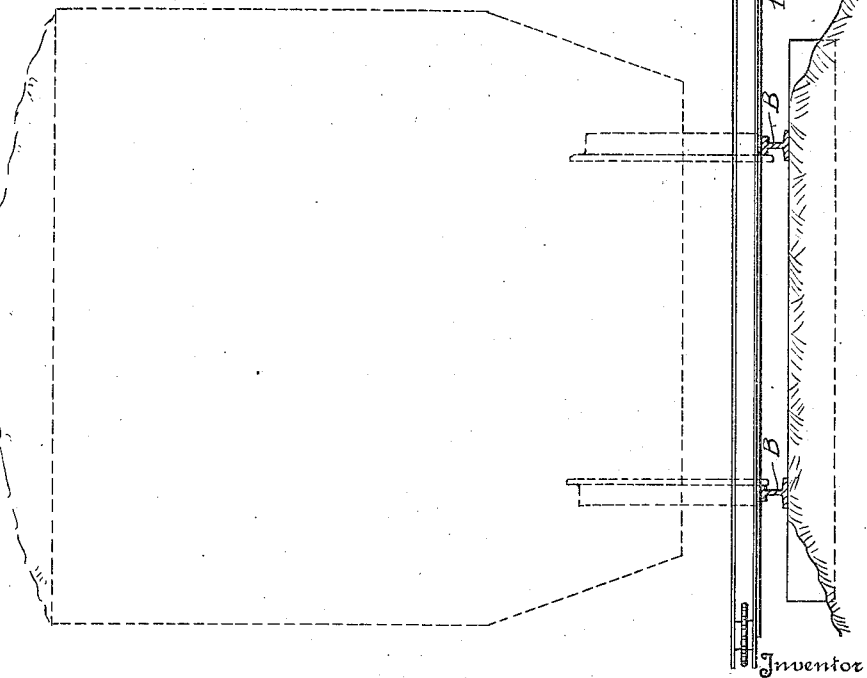
Inventor
Franklin E. Arndt
By Frederick S. ___
Attorney Patented Dec. 5, 1922.

1,437,581

UNITED STATES PATENT OFFICE.

FRANKLIN E. ARNDT, OF GALION, OHIO, ASSIGNOR TO THE GALION IRON WORKS & MFG. CO., OF GALION, OHIO, A CORPORATION OF OHIO.

CONVEYING MECHANISM FOR UNLOADING MACHINES.

Application filed March 25, 1922. Serial No. 546,756.

*To all whom it may concern:*

Be it known that I, FRANKLIN E. ARNDT, a citizen of the United States, residing at Galion, in the county of Crawford and State of Ohio, have invented certain new and useful Improvements in Conveying Mechanisms for Unloading Machines, of which the following is a specification.

This invention relates to elevating mechanism of the general type which is disclosed and claimed in my Patent #1,318,472, granted on the 14th day of October, 1919, wherein there is an upwardly extending elevator located at one side of a track, the lower end of the elevator being disposed in a pit, and mechanism being provided whereby material discharged from the car will flow into said pit and thus be taken up by the elevator.

The general object of the present invention is to provide means for conveying coal, crushed stone, slag, gravel or like material from under a hopper bottom car, for instance, to the elevator pit, and in this connection to provide an apparatus of this kind comprising one or more horizontally movable conveyors which are driven from the driving mechanism of the elevator and which will carry the material over the face of a plate into said pit.

Still another object is to provide mechanism of this character including two conveyors having outwardly extending blades moving over the surface of the said plate, these conveyors being so mounted that the outer ends of the conveyors away from the pit may be shifted toward or away from each other to thus make the passageway between the conveyors and between the conveyor fingers wider and narrower as desired, and in this connection to provide means whereby these two conveyors may be swung either both to the right, both to the left, or in opposite directions.

A further object is to provide a mechanism of this character wherein the conveyors are operated by mechanism disposed above the plate over which the conveyors move so as to do away with the necessity of forming a pit for the accommodation of this conveyor driving mechanism.

Other objects will appear in the course of the following description.

My invention is illustrated in the accompanying drawings, wherein:—

Figure 1 is a top plan view of a conveyor structure constructed in accordance with my invention;

Figure 2 is a longitudinal sectional view thereof on the line 2—2 of Figure 1;

Figure 3 is a top plan view of one of the conveyors 14, showing the conveying chain in dotted lines;

Figure 4 is a longitudinal section on the line 4—4 of Figure 3;

Figure 5 is a transverse sectional view on the line 5—5 of Figure 2, the conveying mechanism being detached;

Figure 6 is a side elevation of a modification, this view showing in dotted lines a car on the track and ready to discharge onto the conveyor;

Figure 7 is a sectional view showing a modified view of the platform or plate associated with the tracks and my conveying mechanism;

Referring more particularly to the construction as illustrated in Figures 1 to 5, A designates a pit disposed to one side of the rails B of a railroad track. In this pit operates the upwardly inclined elevator C whose construction forms no part of my invention, the shaft C' of this elevator carrying a clutch D and a sprocket wheel E. The elevator may be driven in any suitable manner not necessary to describe herein but fully described in my prior patent.

Forming part of the pit A and disposed between the main portion of the pit A and the rails B is a second pit 10 wherein the driving mechanism for the conveyors is disposed. Before describing this driving apparatus I will describe the conveying mechanism. This conveying mechanism includes a plate 11 which constitutes a support or platform, this plate 11 at its forward end discharging onto a downwardly and forwardly inclined chute 12 formed with parallel wings 13 by which the material is discharged onto the buckets of the elevator C.

Pivotally mounted upon the plate 11 are a pair of conveyors, each consisting of an upper plate 14 and a lower plate 15. These plates are supported in spaced relation to each other by longitudinally extending channels 16, with the bolts 17 passing through the channel irons and the plates and holding the plates down against the channel irons 16 so that the two plates are held in spaced relation. Disposed between the forward ends of the pair of plates for each conveyor is a sprocket bearing member 18 formed in upper and lower sections which carry the brass bushings 19. This bearing member 18 is held in place by bolts 20 passing through the plates and may be constructed in any suitable manner, and provides a bearing for the hub 21 of a sprocket wheel 22. This sprocket wheel is formed with a central, many-sided and preferably square opening 23 for the passage of the driving pin or shaft whereby the sprocket wheel is driven. Disposed between the channel irons at the opposite ends of the plates 14 and 15 and rectilinearly movable between these plates is an adjustment block 24 which is formed in two parts, has the bushing 25, and constitutes a bearing for the idler sprocket wheel 26. This adjustment block is longitudinally movable by means of an adjusting screw 27 which passes through a stationary adjusting block 28 bolted to the plates. A nut 29 engages the screw and bears against the stationary adjustment block 28 so that as this nut is turned in one direction, the slidable adjustment block 24 will be shifted outward. This nut 29 is held from turning by a lug on a cover plate 30, which is held in place by the bolts 31 and which has the downwardly extending lug 32 engaging the nut 29 and holding this nut from accidental rotation. This movable block 24 constitutes means whereby an endless chain 33 may be tightened from time to time. This chain 33 is adapted to be engaged by the teeth on the sprocket wheels 22 and 26 and attached at intervals to this chain are the outwardly extending blades 34 which sweep or scrape over the face of the plate 11.

It will be seen that with this construction each conveyor is operatively pivoted by the block 18 to the shaft which operates the sprocket wheel 23 so that each conveyor may be pivotally shifted laterally toward or from the other and thus the blades of the conveyor brought nearer to or farther from each other. I do not wish to be limited to the particular character of the blades 34, nor to their particular means of attachment to the endless chain.

Disposed within the pit 10 is a supporting frame 35 which has bearings 36 for a shaft 37 which extends transversely of plate 11.

This shaft carries upon it at one end the sprocket wheel 38, power being transmitted to this sprocket wheel from the sprocket wheel E on shaft C′ by means of a sprocket chain or other suitable gearing. Also mounted upon this shaft 37 are a pair of beveled pinions 39, one for each conveyor. Forming part of the frame 35 are the upwardly extending yokes 40 which support a vertical bearing 41 for a shaft 42. The lower end of this shaft carries upon it a beveled gear wheel 43 which meshes with the corresponding beveled pinion 39, and the upper end of the shaft has attached to it the sleeve 44 which is keyed or otherwise held in place upon the shaft. This sleeve 44 extends upward to a point immediately beneath the plate 11 and the upper end of the sleeve is formed with a many-sided socket 45 separated from the lower portion of the sleeve by a transverse septum 46 and illustrated as square in cross section. Adapted to be disposed in this socket is a driving pin 47 having a handle whereby it may be lifted out of position or put in place. It will be obvious that with this construction the conveyors are detachably connected to the driving mechanism therefor.

With this construction, when a bottom dumping car has been driven upon the tracks B to a position opposite the pit 10, the plate 11 is inserted beneath the car and brought in such position that the pins 47 will pass through the proper perforations in the plate and into the sockets 45 in the sleeves 44. It will be obvious now that when power is applied to the elevator, power will also be applied to the conveyors, these conveyors moving in opposite directions to cause the adjacent arms or blades of the conveyors to move in the same direction and thus carry the material from beneath the car into the pit. The conveyors may be initially disposed in a divergent relation so that the material at the margins of the heap may be carried inward and then as the heap is reduced the conveyors may be brought nearer to each other, until eventually they are parallel. If the car should discharge a little to one side or the other of the center line, it is obvious that both the conveyors may be shifted into more or less parallel relation but angular with relation to the plate and will act in the same way. In other words, these conveyors may be manipulated in any desired manner to secure the full conveyance of the material discharged from the dumping car into the pit.

I do not wish to be limited to a construction wherein the operating mechanism for the conveyors is disposed in the pit 10, that is below the plate 11, and in Figure 6, I illustrate a construction wherein the operating mechanism is disposed on a higher level than the conveyors. In this the plate 11 and the conveyors mounted thereon are of precisely the same construction as the plate 11 and conveyors illustrated in Figures 1 to 6, and the only difference is that I provide shafts 42$^a$ which extend upward and pass through bearings 41$^a$ which are mounted upon the plate 11. The shaft 42$^a$ at its lower end is operatively connected to the sprocket wheel 22 and at its upper end carries the beveled gear wheel 43$^a$ engaging the beveled pinion 39$^a$ mounted upon the transverse shaft 37$^a$ which carries the sprocket wheel 38$^a$ which is driven by a sprocket chain from a sprocket wheel E′ mounted upon a counter-shaft and driven from the elevator driving mechanism. This construction does away with the necessity of the pit 10 for accommodating the driving mechanism and disposes the driving mechanism for the conveyors above the level of the plate and in a more convenient position. Of course, in this case the plate 11 with the conveyors and the driving mechanism mounted thereon is inserted beneath the car and then the car is dumped, and when the material has been discharged onto the conveyor and it is desired to move the car along, the sprocket chain is removed from its engagement with the sprocket wheel 28$^a$ and the conveyors and the plate 11 are removed from beneath the car.

While I have illustrated a plate such as a plate of sheet metal upon which the coal from the car is discharged, which plate lies over and rests upon the rails of the track, I do not wish to be limited thereto, as it is within the purview of my invention to provide a plate or platform which shall be flush with the tracks and over which the conveyors may operate and upon which the material may be discharged, and in Figure 7 I illustrate fragmentarily a platform of this character, which platform is designated 11$^a$. It will be seen that in the construction which I have described there is a main conveyor, which I have heretofore referred to as the elevator C, and a subsidiary conveyor formed of the plate 11 and the pair of elongated horizontal operating conveyors 14, and that I have provided means affording a detachable driving connection between the main and subsidiary conveyors.

It is to be understood that I do not wish to be limited to the use of this apparatus with the particular form of conveyor shown, as it is obvious that a skip hoist can be used if necessary in place of an endless conveyor, nor do I wish to be limited to the use of this device with an elevator as it is obvious that the device might be used to discharge material into a chute.

I claim:—

1. The combination with a power operated main conveyor, of a subsidiary conveyor discharging thereonto, and means detachable from the subsidiary conveyor forming a driving connection between the main conveyor and the subsidiary conveyor.

2. The combination with a power operated main conveyor, of a subsidiary conveyor discharging material thereon, and detachable means forming the driving connection between the main conveyor and the subsidiary conveyor.

3. The combination with a power operated main conveyor and a subsidiary conveyor operating to discharge material thereon, of means affording a detachable driving connection between the main conveyor and the subsidiary conveyor and including a driving shaft operated from the main conveyor, and a driving wheel on the subsidiary conveyor having detachable driving connection with said shaft.

4. The combination with a main power operated conveyor, of a plate discharging thereon, a subsidiary conveyor resting upon said plate and extending across the same, causing the passage of material across the plate onto the main conveyor, said subsidiary conveyor including a rotatable element having a socket, and a vertical driving shaft operatively driven from the main conveyor and adapted to be detachably engaged with said socket.

5. The combination with a main power operated conveyor, of a plate extending over and discharging upon the conveyor, an endless conveyor mounted upon the plate and operating thereover and acting to carry material across the surface of the plate and onto the main conveyor and including a rotatable element having a socket, a vertical shaft, means for driving the shaft from the main conveyor, and a detachable connection between said shaft and the rotatable element.

6. A conveyor structure of the character described including a supporting plate upon which material is adapted to be discharged, two rotatable driving elements disposed at right angles to the plate, two conveyor frames disposed upon the plate and into which the driving elements project, oppositely disposed sprocket wheels mounted on each of said frames at opposite ends thereof, the corresponding driving element operatively engaging a sprocket wheel on the corresponding frame, a bladed endless element passing over said sprocket wheels, the blades operating over the face of said plate, means for driving the elements in opposite directions to cause the adjacent blades of the conveyors to move in the same direction, said conveyor frames being independently shiftable into angular relation to the axis of the plate and each around the axis of its driving element.

7. A conveyor structure of the character described including a supporting plate upon which material is discharged, a rotatable power driven driving element extending at right angles to the plate, a conveyor frame consisting of upper and lower plates through which the driving element passes, the plates being operatively connected to each other and oscillatable around the axis of the driving element, sprocket wheels mounted between said plates at opposite ends thereof, with one of which sprocket wheels the driving element has rotative engagement, and an endless chain mounted upon said sprocket wheels and having outwardly projecting blades.

8. A conveyor structure of the character described including a supporting plate upon which material is discharged, a rotatable power driven driving element extending at right angles to the plate, a conveyor frame consisting of upper and lower plates through which the driving element passes, the plates being operatively connected to each other and oscillatable around the axis of the driving element, sprocket wheels mounted between said plates at opposite ends thereof, with one of which sprocket wheels the driving element has rotative engagement, and an endless chain mounted upon said sprocket wheels and having outwardly projecting blades, one of said sprocket wheels being longitudinally adjustable to tighten the sprocket chain.

9. A conveyor structure of the character described including a supporting plate upon which material is discharged, a rotatable power driven driving element extending at right angles to the plate, a conveyor frame consisting of upper and lower plates through which the driving element passes, the plates being operatively connected to each other and oscillatable around the axis of the driving element, sprocket wheels mounted between said plates at opposite ends thereof, with one of which sprocket wheels the driving element has rotative engagement, an endless chain mounted upon said sprocket wheels and having outwardly projecting blades, one of said sprocket wheels being longitudinally adjustable to tighten the sprocket chain, means for adjusting the last named sprocket wheel comprising a sliding block upon which the sprocket wheel is mounted, a fixed abutment, a screw engaging the block and passing through the fixed abutment, a nut on the screw engaging the fixed abutment, one of said plates having an opening through which the nut may be adjusted, and a detachable cover plate having a lug engaging said nut and holding it from rotation.

10. A conveyor structure of the character described including a supporting plate upon which material is discharged and disposed in a horizontal position, vertically disposed driving elements at one end of the plate, a pair of conveyor supporting frames through which said elements pass, the frames being oscillatable around their respective elements, sprocket wheels carried upon opposite ends of said frames, with one of which sprocket wheels the corresponding rotatable element engages, endless chains passing around said sprocket wheels and having outwardly extending blades operating over the face of the plate, beveled gear wheels mounted upon said driving elements, and a transverse power driven shaft having beveled pinions engageable with the beveled gear wheels.

11. A conveyor structure of the character described including a horizontal plate adapted to receive material, a pair of elongated conveyors oscillatably mounted upon the plate and including endless elements having outwardly projecting blades, rotatable driving members disposed adjacent one end of the plate, and detachable means for operatively connecting said conveyors to the driving means.

12. A conveyor structure of the character described including a horizontal plate adapted to receive material, a pair of elongated conveyors oscillatably mounted upon the plate and including endless elements having outwardly projecting blades, rotatable driving members disposed adjacent one end of the plate, detachable means for operatively connecting said conveyors to the driving means, and detachable pins adapted to engage and rotate with the driving elements and have detachable engagement with the conveyors.

13. A conveyor structure of the character described including a plate adapted to receive material, a pair of longitudinally elongated conveyor frames disposed upon the plate, sprocket wheels carried at the opposite end of each frame, one of said sprocket wheels at one end of the frame having a many-sided socket, an endless element passing around the sprocket wheels of each frame and having outwardly projecting blades sweeping over the surface of the plate, rotatable driving shafts disposed adjacent one end of the plate, and removable pins adapted to be inserted through the sockets in said sprockets and into operative engagement with the driving shaft.

14. A conveyor structure of the character described including a plate adapted to receive material, a pair of longitudinally elongated conveyor frames disposed upon the plate, sprocket wheels carried at the opposite end of each frame, one of said sprocket wheels at one end of the frame having a many-sided socket, an endless element passing around the sprocket wheels of each frame and having outwardly projecting blades sweeping over the surface of the plate, rotatable driving shafts disposed adjacent one end of the plate, removable pins adapted to be inserted through the sockets in said sprockets and into operative engagement with the driving shafts, beveled gear wheels mounted upon the driving shafts, a transverse power driven shaft, and beveled pinions mounted upon the power driven shafts and engaging said beveled gear wheels.

In testimony whereof I affix my signature.

FRANKLIN E. ARNDT.